(12) United States Patent
Greywall

(10) Patent No.: US 7,628,041 B2
(45) Date of Patent: Dec. 8, 2009

(54) CARBON PARTICLE FIBER ASSEMBLY TECHNIQUE

(75) Inventor: Dennis S Greywall, Whitehouse Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1026 days.

(21) Appl. No.: 10/789,074

(22) Filed: Feb. 27, 2004

(65) Prior Publication Data

US 2005/0188727 A1  Sep. 1, 2005

(51) Int. Cl.
*C03C 14/00* (2006.01)
*C03B 37/02* (2006.01)
*C03B 37/016* (2006.01)

(52) U.S. Cl. .............................. 65/442; 65/395; 65/440; 65/401

(58) Field of Classification Search .................... 65/395, 65/427, 442, 402, 438, 440
See application file for complete search history.

(56) References Cited

U.S. PATENT DOCUMENTS

| | | | |
|---|---|---|---|
| 5,240,488 A * | 8/1993 | Chandross et al. ............ | 65/395 |
| 5,643,990 A | 7/1997 | Uehara et al. | |
| 6,299,812 B1 | 10/2001 | Newman et al. | |
| 6,331,265 B1 | 12/2001 | Dupire et al. | |
| 6,682,677 B2 | 1/2004 | Lobovsky et al. | |
| 2001/0052656 A1 | 12/2001 | Newman et al. | |
| 2002/0113335 A1 | 8/2002 | Lobovsky et al. | |
| 2002/0159943 A1 | 10/2002 | Smalley et al. | |
| 2003/0236588 A1 | 12/2003 | Jang et al. | |
| 2004/0096389 A1 | 5/2004 | Lobovsky et al. | |
| 2005/0054830 A1 | 3/2005 | Islam et al. | |
| 2005/0100501 A1 | 5/2005 | Veedu et al. | |
| 2005/0228110 A1 | 10/2005 | Ko et al. | |
| 2005/0239948 A1 | 10/2005 | Haik et al. | |
| 2005/0269726 A1 | 12/2005 | Matabayas, Jr. | |
| 2006/0099135 A1 | 5/2006 | Yodh et al. | |

FOREIGN PATENT DOCUMENTS

| | | |
|---|---|---|
| DE | 35 16 920 A1 | 11/1985 |
| DE | 3516920 A1 * | 11/1985 |
| GB | 1 174 959 A | 12/1969 |
| WO | WO 01/12700 A1 | 2/2001 |
| WO | WO 02/055769 A1 | 7/2002 |

OTHER PUBLICATIONS

Kumar et. al., "Synthesis, Structure, and Properties of PBO/SWNT Composites", Macromolesules 2002, 35, 9039-9043.*

(Continued)

*Primary Examiner*—Steven P. Griffin
*Assistant Examiner*—Jason L. Lazorcik
(74) *Attorney, Agent, or Firm*—Mendelsohn, Drucker & Associates, P.C.; E. J. Rosenthal

(57) ABSTRACT

Carbon particles, such as, carbon fibrils and carbon nanotube molecules, are assembled into aligned fibers using processes derived from the processes used to manufacture optical fiber. More particularly, the carbon particles are embedded in glass, which is then drawn to align them. By aligned it is meant the axis along the longest dimension of each of the various particles in a local vicinity are substantially parallel.

35 Claims, 3 Drawing Sheets

OTHER PUBLICATIONS

Machine translation of Roeder (DE 3, 516,920)—Obtained from EPO site Jan. 18, 2007.*

Zhang et. al., "Multifunctional carbon Nanotube Yarns by Downsizing an Ancient Technology", Science v.306(5700), 2004, pp. 1358-1361. Note: reference sets forth general teaching in art originally presented by Hearle et. al. (Hearle, J., Grosberg, P., Backer, S., "Structural Mechanics of Fibers, Yarns, and Fabrics", vol. 1 (Wiley New York, 1969).*

Roeder, E., English language translation of German Patent DE 3,516,920; see entire document.*

"Nanotube Composite Carbon Fibers," by R. Andrews et al., Applied Physics Letters, American Institute of Physics, New York, US vol. 75, No. 9, Aug. 30, 1999, pp. 1329-1331.

U.S. Appl. No. 10/789,154, Greywall et al., filed Feb. 27, 2004.

Kamiya et al., "Preparation Of Silicon Oxycarbide Glass Fiber By Sol-Gel Method—Effect Of Starting Sol Composition On Tensile Strength of Fibers", *Journal of Sol-Gel Science and Technology*, Kluwer Academic Publishers, Dordrecht, NL, vol. 14, No. 1, Mar. 1999, pp. 95-102.

* cited by examiner

CARBON PARTICLE FIBER ASSEMBLY TECHNIQUE

CROSS-REFERENCE TO RELATED APPLICATION

This application is related to concurrently filed U.S. application Ser. No. 10/789,154, which is incorporated by reference as if fully set forth herein.

TECHNICAL FIELD

This invention relates to carbon particles such as carbon nanotube molecules and carbon fibrils, and more particularly, to the art of assembling carbon particles into fibers in which the carbon particles are aligned.

BACKGROUND OF THE INVENTION

Carbon particles, such as carbon nanotube molecules and carbon fibrils, have an away of properties, including electrical, mechanical, and heat conducting properties, that are highly desirable. However, the particles are relatively short, e.g., the longest ones are on the order of a few microns. Unfortunately, such lengths are generally unsuitable for applications in which the properties of the carbon particles can prove beneficial.

SUMMARY OF THE INVENTION

I have recognized that, in accordance with the principles of the invention, carbon particles, such as, carbon fibrils and carbon nanotube molecules, may be assembled into aligned fibers using processes derived from the processes used to manufacture optical fiber. More particularly, the carbon particles are embedded in glass, which is then drawn to align them. By aligned it is meant that the axis along the longest dimension of each of the various particles in a local vicinity are substantially parallel.

In one embodiment of the invention, the carbon particles are carbon nanotube molecules, and an initial mixture is formed by dispersing carbon nanotube molecules within sol-gel solution, which is a form of liquid glass. An ester is added to the mixture, causing it to solidify into a body, which may be porous. At this point the body may optionally be imbued with one or more other materials to influence the properties of the body so as to benefit the processing or the characteristics of the final fiber. The body may then be heated to consolidate it, i.e., to remove some or all of the pores, if any, thereby forming a consolidated body. The heating may be performed in the presence of a gas, e.g., to keep oxygen away from the consolidated body. The consolidated body is then drawn into a fiber.

The drawing into a fiber may be achieved by inserting the consolidated body within a larger glass body with a hole in it, e.g., a piece of glass tubing, that can receive the consolidated body. In accordance with an aspect of the invention, multiple consolidated bodies may be placed within the larger glass body, provided that the larger glass body has multiple holes, at least one for each consolidated body. The larger glass body including the at least one consolidated body is then further consolidated, e.g., heated, so that the consolidated bodies are merged with the larger glass body into a single so-called "preform".

The preform is then drawn, using conventional optical fiber techniques, into a glass fiber that has at least one carbon nanotube fiber within it, e.g., one for each consolidated body that was placed within the larger glass body. In accordance with an aspect of the invention, as the glass fiber containing the carbon nanotube molecules is drawn, the carbon nanotube molecules from each consolidated body respectively align themselves and bond together to form each carbon nanotube fiber within the glass fiber. Optionally, the drawn glass fiber containing carbon nanotube fibers may be twisted, and reheated if necessary to facilitate the twisting, thereby causing the carbon nanotube fibers to be drawn toward the axis of the glass fiber and thereby expel some of the glass between and within the carbon nanotube fibers. Lastly, optionally, some or all of the glass coating the carbon nanotube fibers may be removed, e.g., using chemical or mechanical processes, or a combination thereof.

In another embodiment of the invention, the carbon particles are carbon fibrils.

In yet a further embodiment of the invention, both carbon fibrils and carbon nanotube molecules are employed to make up a single fiber.

In yet a further embodiment of the invention, carbon fibrils are employed to make up one fiber and carbon nanotube molecules are employed to make up another fiber, and the two fibers are twisted in the optional twisting step.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that diagrams herein may represent conceptual views embodying the principles of the invention.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

Concurrently filed application, U.S. patent application Ser. No. 10/789,154, which is incorporated by reference as if fully set forth herein.

In the description, identically numbered components within different ones of the FIGs. refer to the same components.

Figure 1:
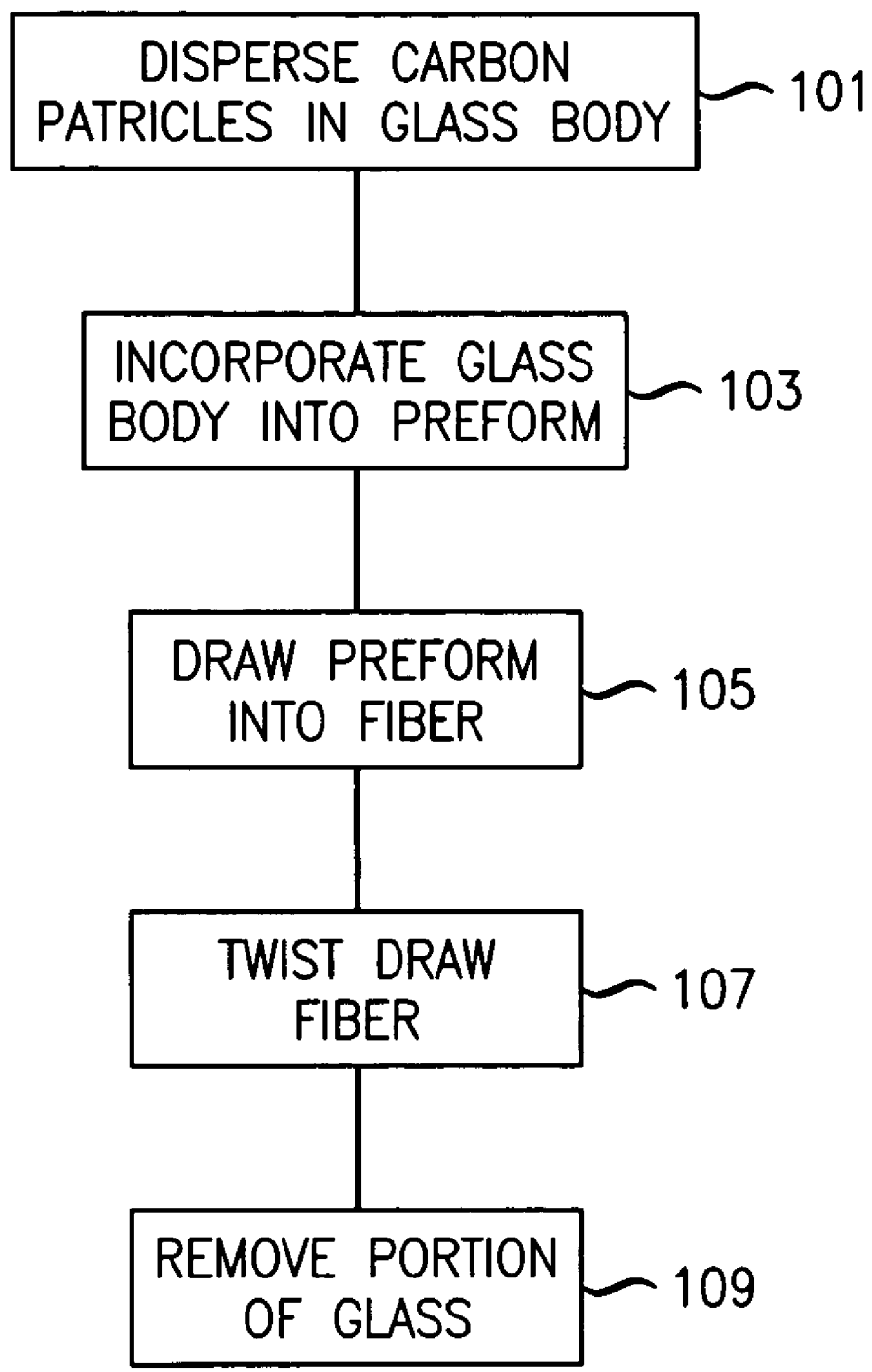
FIG. 1 shows an exemplary process, in accordance with the principles of the invention, for assembling carbon particles into aligned fibers.

FIG. 1 shows an exemplary process, in accordance with the principles of the invention, for assembling carbon particles, such as, carbon fibrils and carbon nanotube molecules, into aligned fibers using processes derived from the processes used to manufacture optical fiber. By aligned it is meant that the axis along the longest dimension of each of the various particles in a local vicinity are substantially parallel.

Figure 2:
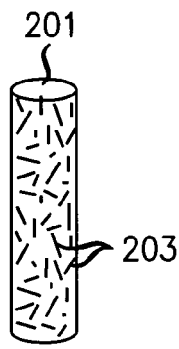
FIG. 2 shows an exemplary consolidated glass body with carbon particles dispersed therein.

The process of FIG. 1 is entered, in step 101, when carbon particles are dispersed in a glass body. This may be achieved, in one embodiment of the invention, by forming an initial mixture through the dispersion of carbon particles, e.g., carbon nanotube molecules, carbon fibrils, or both in combination, within a sol-gel solution, which is a form of liquid glass. Thereafter, an ester is added to the mixture, causing it to solidify into the body, which may be porous. At this point the body may optionally be imbued with one or more other materials to influence the properties of the body so as to benefit the processing or the characteristics of the final fiber. The body may then be heated to consolidate it, i.e., to remove some or all of the pores, if any, thereby forming a consolidated body. The heating may be performed in the presence of a gas, e.g., to keep oxygen away from the consolidated body. FIG. 2 shows exemplary consolidated glass body 201 with carbon particles 203 dispersed therein.

The consolidated body 201 may be directly drawn into a fiber in step 105, the drawing step to be discussed further herein below. However, optionally, in step 103 the consolidated body may be incorporated into a preform, so that, advantageously, conventional glass fiber drawing equipment may be employed.

Figure 3:
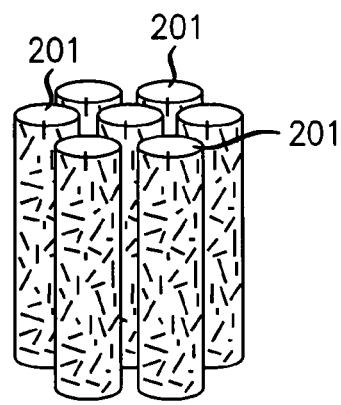
FIG. 3 shows multiple consolidated bodies that are each placed within a respective hole of larger glass body.
Figure 3:
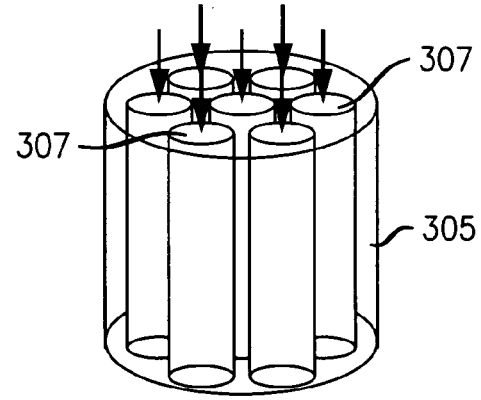

To this end, first, as part of step 103, consolidated glass body 201 is placed within a larger glass body with a hole in it, e.g., a piece of glass tubing, that can receive the consolidated body. In accordance with an aspect of the invention, multiple consolidated bodies may be placed within the larger glass body, provided that the larger glass body has multiple holes, at least one for each consolidated body. This is shown in FIG. 3, where each of consolidated bodies 201 are placed within a respective hole 307 of larger glass body 305. Note that the various consolidated bodies placed within a single larger glass body need not be the same. For example, one consolidated body may contain carbon fibrils, another may contain carbon nanotube molecules, and a third may contain a mixture of carbon fibrils and nanotube molecules. Those of ordinary skill in the art will be able to select the type or types of consolidated bodies appropriate for their applications.

To complete the formation of the preform in step 103, the larger glass body including the at least one consolidated body is then further consolidated, e.g., heated, so that the consolidated bodies are merged with the larger glass body into a single so-called "preform".

In step 105, the preform is then drawn, using conventional optical fiber techniques, into a glass fiber that has at least one aligned carbon particle fiber within it, e.g., one for each consolidated body that was placed within the larger glass body.

Figure 4:
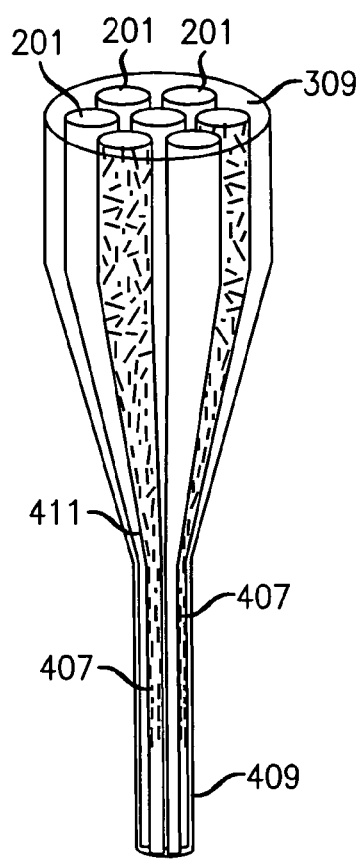
FIG. 4 shows a preform in which the drawing process has started to produce therefrom aligned carbon particle fiber within the glass fiber.

FIG. 4 shows preform 309 in which the drawing process has started to produce therefrom aligned carbon particle fiber 407 within glass fiber 409. In accordance with an aspect of the invention, as glass fiber 409 is drawn the carbon particles from each consolidated body 201, respectively, align themselves and bond together to form each aligned carbon particle fiber within the glass fiber, e.g., in the vicinity of point 411. By aligned it is meant the axis along the longest dimension of each the various carbon particles in a local vicinity are substantially parallel. This can be seen in FIG. 4, where carbon particles closer to preform 309 than point 411 are randomly oriented while carbon particles within fiber 409 further from preform 309 than point 411 are pointing in substantially the same direction.

Figure 5:
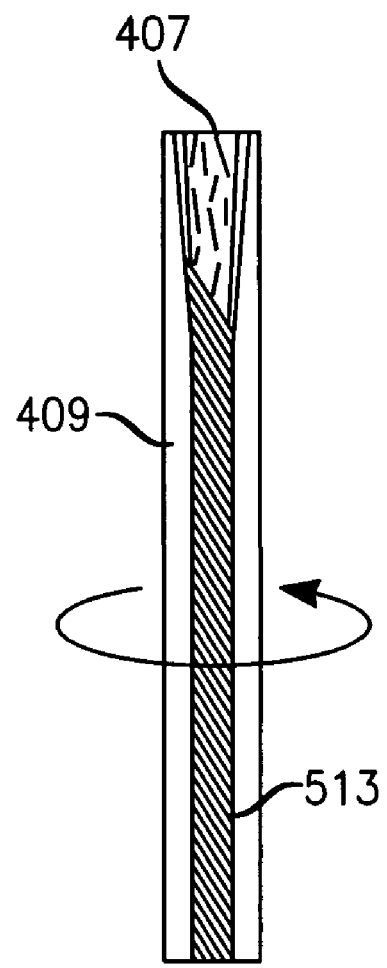
FIG. 5 shows the twisting of aligned carbon particle fibers and the resulting combined twisted aligned carbon particle fiber.

Optionally, in step 107, the drawn glass fiber may be twisted. Such twisting causes the carbon nanotube fibers to be drawn toward the axis of the glass fiber, thereby expelling some of the glass between and within the carbon particles. If necessary, to facilitate the twisting process, the glass fiber may be reheated. The twisting of aligned carbon particle fibers 407 and the resulting combined twisted aligned carbon particle fiber 513 are shown in FIG. 5.

Figure 6:
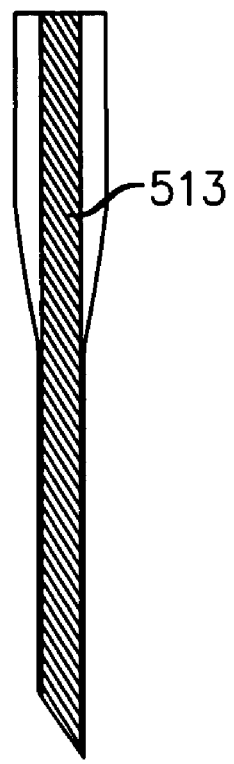
FIG. 6 shows a combined twisted aligned carbon particle fiber with a portion of the glass having been removed.

Lastly, in optional step 109, some or all of the glass coating the aligned carbon particle fibers may be removed, e.g., using chemical or mechanical processes, or a combination thereof. Also, glass between the combined twisted aligned carbon particle fibers may also be removed. The removal may be performed along the entire length of the fiber or only along a portion thereof. FIG. 6 shows combined twisted aligned carbon particle fiber 513 with a portion of the glass having been removed.

Advantageously, the process produces aligned carbon particle fibers, which may include glass between or around the aligned carbon particle fibers.

What is claimed is:

1. A method for assembling carbon particles into at least one aligned carbon fiber, the method comprising the step of drawing glass containing said carbon particles so as to form at least one carbon fiber from said carbon particles.

2. The invention as defined in claim 1 wherein said carbon particles are carbon nanotube molecules.

3. The invention as defined in claim 1 wherein said carbon particles are carbon fibrils.

4. The invention as defined in claim 1 further comprising the step of twisting said fiber.

5. The invention as defined in claim 1 further comprising the step of twisting said fiber while heating said fiber to facilitate its twisting.

6. The invention as defined in claim 1 further comprising the step of heating said glass containing carbon particles while drawing it.

7. The invention as defined in claim 1 further comprising the step of forming said glass containing carbon particles.

8. The invention as defined in claim 7 wherein said forming step further comprises the step of solidifying a mixture of carbon particles within a sol-gel solution whereby a body is formed.

9. The invention as defined in claim 8 wherein said forming step further comprises the step of dispersing carbon particles within said sol-gel solution to form said mixture.

10. The invention as defined in claim 1 further comprising the step of removing some glass from said carbon fiber.

11. The invention as defined in claim 10 wherein said glass that is removed is from an exterior portion of said carbon fiber.

12. The invention as defined in claim 10 wherein said removing is performed using at least a mechanical process.

13. The invention as defined in claim 10 wherein said removing is performed using at least a chemical process.

14. The invention as defined in claim 1, further comprising the steps of:
    dispersing said carbon particles within a form of liquid glass to form a sol-gel solution; and
    solidifying the sol-gel solution to form a glass body containing therein said carbon particles, wherein the step of drawing comprises:
        drawing said glass body into the at least one carbon fiber.

15. The invention as defined in claim 14, wherein said solidifying step comprises adding an ester to said sol-gel solution.

16. The invention as defined in claim 14, wherein said body is porous.

17. The invention as defined in claim 14, further comprising the step of imbuing said body with at least one other material.

18. The invention as defined in claim 14, further comprising the step of heating said glass body to consolidate it, whereby a consolidated body is formed.

19. The invention as defined in claim 14, further comprising the step of incorporating said glass body into a larger structure to form a preform.

20. The invention as defined in claim 19, wherein said larger structure is a glass structure having a hole that is sized to receive said glass body.

21. The invention as defined in claim 19, further comprising the step of heating said preform to consolidate it.

22. The invention as defined in claim 19 further comprising the step of incorporating at least one other body into said larger body so that said preform contains multiple bodies.

23. The invention as defined in claim 14, wherein said drawing step produces a plurality of aligned carbon fibers, the method further comprising the step of expelling glass that is located between and within said aligned carbon fibers.

24. The invention as defined in claim 23, wherein said expelling step comprises twisting said plurality of aligned carbon fibers, whereby said aligned carbon fibers are drawn towards the axis of said fiber.

25. A method for assembling carbon particles into at least one aligned carbon fiber, the method comprising the step of drawing a preform of glass containing carbon particles so as to form said carbon fiber, whereby said carbon particles are substantially aligned.

26. The invention as defined in claim 25 wherein said carbon particles are carbon nanotube molecules.

27. The invention as defined in claim 25 wherein said carbon particles are carbon fibrils.

28. The invention as defined in claim 25, further comprising the steps of:
    dispersing carbon particles within a form of liquid glass to form a sol-gel solution;
    solidifying the sol-gel solution to form a glass body containing therein said carbon particles; and
    incorporating said glass body into a larger glass structure to form a preform, wherein the step of drawing comprises:
        drawing the preform into said carbon fiber.

29. The invention as defined in claim 28, wherein said drawing step produces a plurality of aligned carbon fibers, the method further comprising the step of expelling glass that is located between and within said aligned carbon fibers.

30. The invention as defined in claim 29, wherein said expelling step comprises twisting said plurality of aligned carbon fibers, whereby said aligned carbon fibers are drawn towards the axis of said fiber.

31. A method for producing at least one carbon fiber, the method comprising the steps of:
    embedding carbon particles in glass; and
    drawing said glass with said embedded carbon particles into a carbon fiber so that said carbon particles are substantially aligned within said carbon fiber.

32. The invention as defined in claim 31 wherein said carbon particles are carbon nanotube molecules.

33. The invention as defined in claim 31, wherein said embedding step comprises:
    dispersing carbon particles within a form of liquid glass to form a sol-gel solution;
    solidifying the sol-gel solution to form said glass with said embedded carbon particles.

34. The invention as defined in claim 33, wherein said drawing step produces a plurality of aligned carbon fibers, the method further comprising the step of expelling glass that is located between and within said aligned carbon fibers.

35. The invention as defined in claim 34, wherein said expelling step comprises twisting said plurality of aligned carbon fibers, whereby said aligned carbon fibers are drawn towards the axis of said fiber.

* * * * *

UNITED STATES PATENT AND TRADEMARK OFFICE
CERTIFICATE OF CORRECTION

PATENT NO. : 7,628,041 B2 Page 1 of 1
APPLICATION NO. : 10/789074
DATED : December 8, 2009
INVENTOR(S) : Dennis S Greywall It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Twenty-first Day of December, 2010

David J. Kappos
*Director of the United States Patent and Trademark Office*